United States Patent [19]

Maschmeyer

[11] Patent Number: 4,537,473
[45] Date of Patent: Aug. 27, 1985

[54] FIDUCIAL SURFACES

[75] Inventor: Richard O. Maschmeyer, Corning, N.Y.

[73] Assignee: Corning Glass Works, Corning, N.Y.

[21] Appl. No.: 639,738

[22] Filed: Aug. 13, 1984

Related U.S. Application Data

[63] Continuation of Ser. No. 439,341, Nov. 5, 1982, abandoned.

[51] Int. Cl.³ .............................................. G02B 3/02
[52] U.S. Cl. .................................. 350/432; 356/359
[58] Field of Search ..................... 350/432, 409, 417; 356/352, 359

[56] References Cited

U.S. PATENT DOCUMENTS

| | | | |
|---|---|---|---|
| 2,410,616 | 11/1946 | Webb | 65/157 |
| 2,637,242 | 5/1953 | Osterberg | 350/432 |
| 3,900,328 | 8/1975 | Parsons et al. | 501/11 |
| 4,139,677 | 2/1979 | Blair et al. | 428/409 |
| 4,251,474 | 2/1981 | Blandin | 264/1 |

OTHER PUBLICATIONS

*Optical Shop Testing*, Malacara, Ed., John Wiley and Sons, New York, pp. 1-42 and 402-406, 1978.

Primary Examiner—John K. Corbin
Assistant Examiner—P. M. Dzierzynski
Attorney, Agent, or Firm—C. S. Janes, Jr.

[57] ABSTRACT

A process for determining the location and/or the alignment of the axis or point of symmetry of an optical surface of a precision optical element, such as an aspheric lens. A fiducial surface is provided on the element, comprising a surface which has a predetermined location and alignment relative to the axis or point of symmetry of the optical surface of the element. Predetermined light waves are impinged against the fiducial surface. The nature of the fiducial surface is such that the light waves are transmitted or reflected in a manner that is a function of the location and/or the alignment of the fiducial surface. The characteristic transmission or reflection of light waves can be resolved by various conventional optical techniques such as by interferometry, thereby precisely indicating the location and/or alignment of the optical surface.

3 Claims, 8 Drawing Figures

FIDUCIAL SURFACES

This is a continuation of application Ser. No. 439,341, filed Nov. 5, 1982 now abandoned.

BACKGROUND OF THE INVENTION

This invention relates to precision optical elements, such as optical lenses, having one or more optical surfaces, particularly one or more, aspheric optical surfaces. This invention quite particularly relates to lenses having one or more fiducial surfaces which can serve as references for precisely determining the location and/or the alignment of the lenses' aspheric surfaces relative to one another and relative to optical systems which contain the lenses. This invention more particularly relates to molded glass lenses having aspheric surfaces and fiducial surfaces in precise locations and alignments relative to one another.

The vast majority of lenses used today in optical systems have spherical optical surfaces. The point symmetry of the spherical surfaces of such lenses makes it possible to locate the optical axes of these surfaces by simple mechanical methods (e.g., by edging techniques) after the surfaces have been fabricated. The symmetry of the spherical surfaces of such lenses also makes it relatively simple to align such surfaces in an optical system. This is because the only misalignment of spherical surfaces that can occur is due to decentration which is relatively easy to correct.

Lenses with aspheric optical surfaces have significant optical advantages over lenses with spherical surfaces. For example, an aspheric lens can be designed so that it does not produce spherical aberration or coma in an optical system. However, the use of aspheric lenses has not been widespread. One reason has been the difficulty of fabricating such a lens with aspheric surfaces having precisely known locations and alignments. In this regard, it has been difficult to determine precisely the location and alignment of the axis of symmetry of an aspheric surface of such a lens during its fabrication, testing and/or end use.

Heretofore, the only way of precisely determining the location and alignment of an aspheric surface has involved measuring the exact contour of the aspheric surface (e.g., with a mechanical stylus or interferometrically). Such a measurement has been inherently complicated and time-consuming to carry out. Also, such a measurement has frequently been impossible (e.g., due to space limitations) to carry-out in certain optical systems. Alternative ways have been sought, therefore, for precisely determining the location and alignment of an aspheric surface of a lens.

SUMMARY OF THE INVENTION

In accordance with this invention, a precision optical element having an optical surface—particularly an aspheric optical surface—is provided with a fiducial surface. The fiducial surface comprises:

a surface on the element which has a predetermined location and alignment relative to the axis or point of symmetry of the optical surface;

the location of the point of symmetry of the optical surface or the location and/or the alignment of the axis of symmetry of the optical surface being ascertainable optically from the behavior of predetermined light waves impinging against the fiducial surface and then being reflected from, or transmitted through, the fiducial surface.

By this invention, the location of the point of symmetry of a spherical surface of an optical element or the location and/or the alignment of the axis of symmetry of an aspheric surface of an optical element can be precisely determined, by optical methods, relative to:

(a) another part (e.g., another spherical or aspheric surface) of the optical element;

(b) a test instrument; or (c) an end use optical instrument. As a result, the process of fabricating the optical element can be modified so that the location and alignment of the optical surface in the optical element is as intended. The optical surface can also be tested to determine that it possesses the desired properties when properly located and aligned in an optical system. Moreover, the optical surface can be precisely located and aligned in an end use optical instrument.

In accordance with one specific aspect of this invention, the optical element comprises at least one aspheric optical surface and at least one fiducial surface extending laterally of the axis of symmetry of the aspheric surface. In one embodiment, the optical element comprises two aspheric surfaces on longitudinally opposite sides of the element and two flat fiducial surfaces on longitudinally opposite sides of the element; each of the fiducial surfaces extending laterally at substantially the same angle to the axis of symmetry of its adjacent aspheric surface on the same side of the element so that the fiducial surfaces are substantially parallel; and the two fiducial surfaces appearing substantially superimposed when viewed along the axes of symmetry of the aspheric surfaces. With this embodiment, any angle between the axes of symmetry of the two aspheric surfaces of the lens, i.e., any wedge, can be precisely determined by optical methods. As a result, the locations and/or the alignments of the two aspheric surfaces of the optical element, relative to one another, can be adjusted in the manufacturing process so as to provide the aspheric surfaces with the desired locations and alignments.

Also in accordance with this invention, a process is provided for optically determining the location and/or the alignment of the axis or point of symmetry of an optical surface of a precision optical element. The process comprises the steps of:

(a) providing a fiducial surface on the element comprising a surface which has a predetermined location and alignment relative to the axis or point of symmetry of the optical surface of the element; and (b) impinging predetermined light waves against the fiducial surface to reflect or transmit the light waves in a manner that is a function of the fiducial surface relative to the path of the light waves.

By this invention, the location of the point of symmetry of a spherical surface or the location and/or the alignment of the axis of symmetry of an aspheric surface can be precisely determined in a quick and easy manner by conventional optical testing techniques.

BRIEF DESCRIPTION OF THE DRAWINGS

Shown in

DETAILED DESCRIPTION OF THE INVENTION

A precision optical element of this invention, such as a lens, can be made from any conventional lens material such as an optically clear glass or plastic, preferably a glass. The optical element can be made with one or more aspheric surfaces, one or more spherical surfaces and one or more fiducial surfaces of this invention by any conventional lens-making process such as the molding processes described in U.S. Pat. Nos. 2,410,616, 3,900,328 and 4,139,677.

Preferably, an optical element of this invention is made to its final size and shape by a process and apparatus such as are disclosed in the U.S. patent application of Marechal et al., Ser. No. 316,861, filed Oct. 30, 1981, entitled "Process To Mold Precision Glass Articles", now U.S. Pat. No. 4,481,023, which is incorporated herein by reference. Such as process and apparatus are adapted to produce a lens of specific shape and size having each of its elements, including the axis of symmetry of each of its aspheric surfaces, positioned in a precise predetermined location and alignment relative to each of its other elements such as its fiducial surfaces. In this regard, this process and apparatus can be used to replicate, in the produced lens, the geometric shapes of the lens-molding surfaces of the apparatus so that there is virtually no optical irregularity in the lens.

Figure 1:
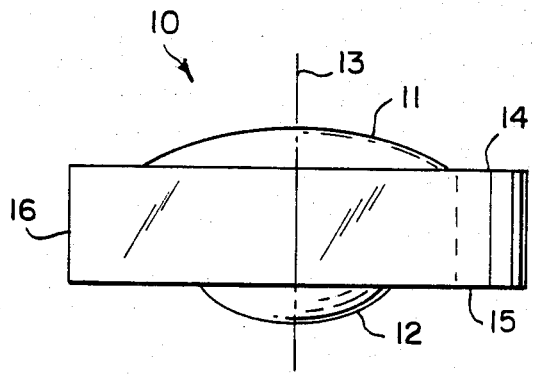
FIG. 1 is a schematic side view of a biaspheric lens of this invention. The lens has aspheric optical surfaces on its front and back, and it includes a pair of parallel flat lands which are located about the aspheric surfaces and which comprise fiducial surfaces.
Figure 2:
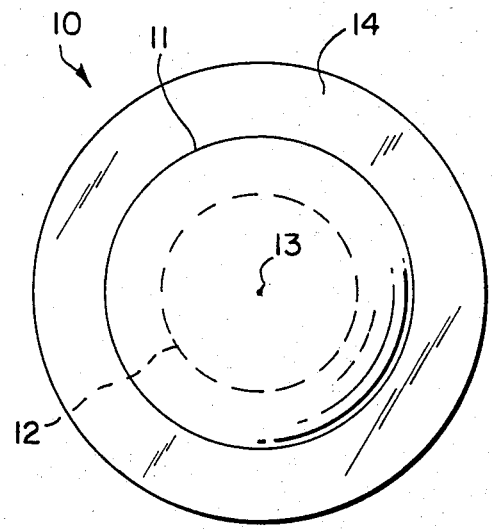
FIG. 2 is a schematic top view of the lens of FIG. 1.

Shown in FIGS. 1 and 2 is a biaspheric lens of this invention, generally 10. The lens 10 comprises two aspheric optical surfaces 11 and 12 on the front and back, respectively, of the lens. The axes of symmetry (not shown) of the aspheric surfaces 11 and 12 are substantially coincident and define a longitudinally extending optical axis 13 of the lens 10. On the same side of the lens as each aspheric surface 11 and 12 is an adjacent flat land 14 and 15, respectively. The lateral ends of the lands 14 and 15 are connected by a smooth, longitudinally extending, cylindrical surface 16 of the lens 10, the axis of the cylindrical surface 16 being substantially coincident with the optical axis 13 of the lens.

Each of the lands 14 and 15 of the lens 10 has a precise predetermined location and alignment relative to the axis of symmetry of its adjacent aspheric surface 11 and 12, respectively. Hence, each land 14 and 15 comprises a fiducial surface of this invention for its adjacent aspheric surface 11 and 12.

Each land 14 and 15 of the lens 10 also extends laterally of the axis of symmetry of its adjacent aspheric surface 11 and 12, respectively. By the use of the term "laterally", with regard to a fiducial surface of this invention, is meant a direction that is at an acute or right angle with the axis of symmetry of the aspheric surface, with which the fiducial surface has a precise predetermined location and alignment. In determining optically the location and/or the alignment of the axis of symmetry of an aspheric surface in accordance with this invention, the use of a laterally extending fiducial surface (e.g., land 14 or 15) is generally preferred over a longitudinally extending fiducial surface (e.g., cylindrical surface 16). For optically determining wedge in the lens 10 in accordance with this invention, it is also preferred that: (a) each land 14 and 15 extend laterally at substantially the same angle, preferably a right angle, to the axis of symmetry of its adjacent aspheric surface 11 and 12, respectively, so that the lands 14 and 15 are substantially parallel; and (b) the lands 14 and 15 appear substantially superimposed when viewed along the axes of symmetry of the aspheric surface 11 and 12.

Preferably, each land 14 and 15 also abuts its adjacent aspheric surface 11 and 12, respectively, and extends circumferentially about the axis of symmetry of its adjacent aspheric surface as shown in FIGS. 1 and 2.

Tilt in the alignment of the axis of symmetry of the front aspheric surface 11 of the lens 10 (and the optical axis 13 of the lens), relative to the optical axis of an optical system, can be precisely determined from the behavior of predetermined light waves impinging against the front land 14 and then being reflected from, or transmitted through, the front land. This determination can be made by, for example:

(a) observing the interference pattern generated by light waves that are parallel to the optical axis of the optical system and that reflect off of the front land 14 of the lens 10 and off of a flat reference surface which is in front of the front land 14 and aligned in a direction normal to the optical axis of the optical system; or (b) observing the specific angle, at which such parallel light waves are reflected off of the front land 14; or (c) observing the specific angle, at which such parallel light waves are bent as they are transmitted through the front land 14 (and the back land 15). Any such observation will precisely indicate if there is any deviation in the alignment of the front land 14 of the lens 10 from a direction normal to the optical axis of the optical system and thereby indicate any corresponding tilt in the axis of symmetry of the front aspheric surface 11 of the lens 10 relative to the optical axis of the optical system.

Figure 3:
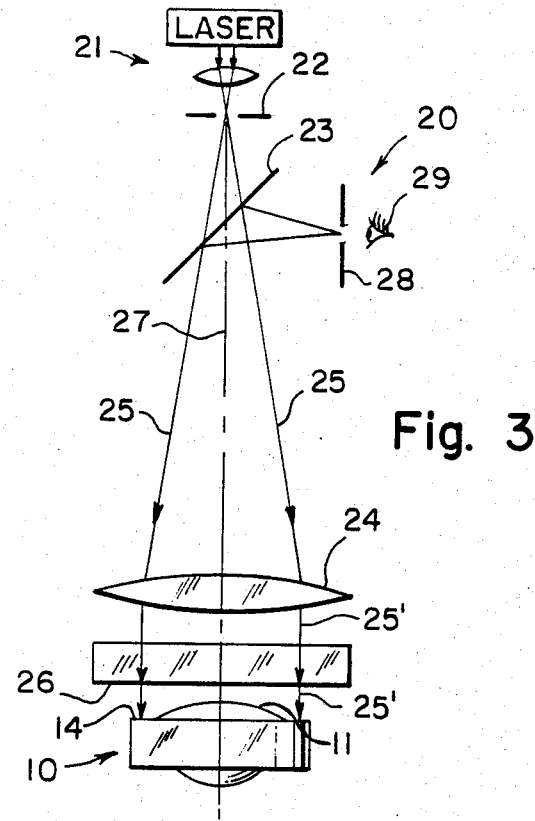
FIG. 3 is a schematic plan view of an optical system in which any angle between the axis of symmetry of the front aspheric surface of the lens of FIG. 1 and the optical axis of the system, i.e., any tilt, can be precisely determined from the interference behavior of light waves impinging against, and reflecting from, the front land of the lens.

Preferably, tilt in the alignment of the axis of symmetry of the front aspheric surface 11 of the lens 10 of FIGS. 1 and 2 in an optical system is determined interferometrically with, for example, a Fizeau interferometer 20 as schematically shown in FIG. 3. As shown in FIG. 3, the interferometer 20 can comprise the following conventional elements: a source of monochromatic light 21 such as a laser; a pinhole 22; a beam divider 23; a collimating lens 24, with its focus at the pinhole 22, for converging the divergent light waves 25 from the pinhole into parallel light waves 25'; a flat reference surface 26, which can be antireflection coated, located in front of the lens 10 and aligned in a direction normal to the optical axis 27 of the interferometer 20; and means 28, such as a pinhole, through which a viewer 29 can observe any interference pattern that is generated as the parallel light waves 25' from the collimating lens 24 impinge at substantially a right angle against, and then reflect off of, the reference surface 26 and the front land 14 of the lens 10. In carrying out this determination, the optical axis 27 of the interferometer 20 is preferably made to coincide with the optical axis of the optical system, in which the lens 10 is to be used (not shown).

The interference pattern, observed with the interferometer 20 from the front land 14 of the lens 10, can also be used to minimize any tilt in the alignment of the axis of symmetry of the front aspheric surface 11 of the lens 10 (and the optical axis 13 of the lens) in the optical system to be used, so as to optimize the performance of the lens in the optical system. In this regard, the observed interference pattern can be used to minimize any deviation in the alignment of the front land 14 of the lens 10 from a direction normal to the optical axis 27 of the interferometer 20 and thereby minimize any tilt of the axis of symmetry of the front aspheric surface 11 of the lens 10 relative to the optical axis 27 of the interferometer 20. In particular, any tilt in the axis of symmetry of the front aspheric surface 11, relative to the optical axis of the optical system to be used, can be minimized by aligning the lens 20 in the interferometer 20 so that the minimum number of, and preferably no, lines of interference are visible through viewing means 28.

Figure 4:
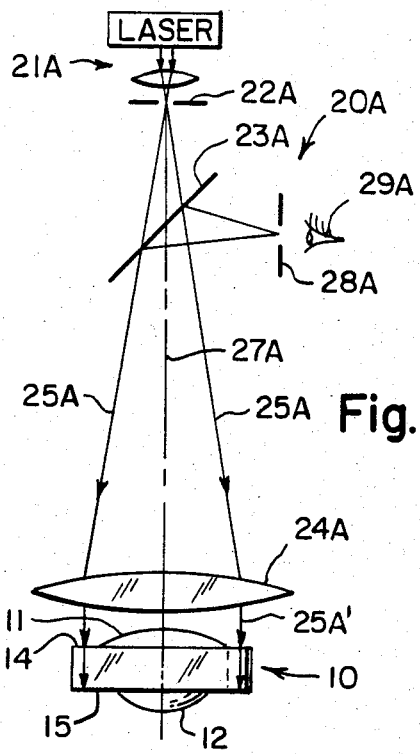
FIG. 4 is a schematic plan view of an optical system in which any wedge in the alignment of the front and back aspheric surfaces of the lens of FIG. 1 can be precisely determined from the interference behavior of light waves impinging against, and reflecting from, the front and back lands of the lens.

The front and back lands 14 and 15 of the lens 10 can also be used to determine precisely, by optical methods, the extent of any wedge in the lens 10. This determination can be made with an apparatus 20A, as schematically shown in FIG. 4, which is like the Fizeau interferometer 20 of FIG. 3 but has no flat reference surface in front of the lens 10. The apparatus 20A of FIG. 4 generates parallel light waves 25A' which impinge against, and then reflect off of, the front and back lands 14 and 15 of the lens 10. If desired, the light waves 25A' can be parallel to one of the axes of symmetry of the aspheric surfaces 11 and 12 of the lens 10 (i.e., no element tilt) as shown in FIG. 4, but such parallelism is not necessary. Any angle between the substantially parallel lands 14 and 15 and any corresponding angle between the axes of symmetry of the two aspheric surfaces 11 and 12 of the lens 10, i.e., any wedge, can be determined from the interference pattern generated between the front and back lands 14 and 15 by the parallel light waves 25A'. Using the wedge angle as determined from the generated interference pattern, one can adjust the alignment of the lens 10 in an optical system in which the lens is to be used, so as to optimize the performance of the lens in the optical system. In this regard, the lens 10 can be aligned in the optical system to be used, so that the angle between the optical axis of the optical system and each of the axes of symmetry of the two aspheric surfaces 11 and 12 is minimized. Preferably, the wedge angle, so determined, is used to adjust the process and apparatus by which the optical element 10 is fabricated, to minimize any wedge angle or provide a desired (e.g., greater) wedge angle.

Figure 5:
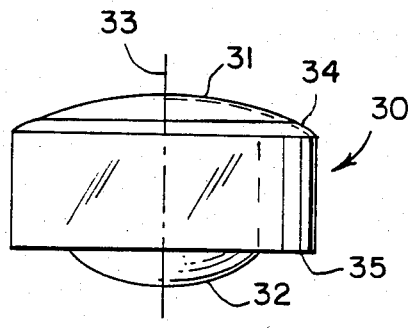
FIG. 5 is a schematic side view of another biaspheric lens of this invention. The lens of FIG. 5 is similar to the lens of FIG. 1, except the front land of the lens of FIG. 1 has been replaced in the lens of FIG. 5 by a spherical surface. The spherical surface is located about the front aspheric surface of the lens of FIG. 5 and comprises a fiducial surface.
Figure 6:
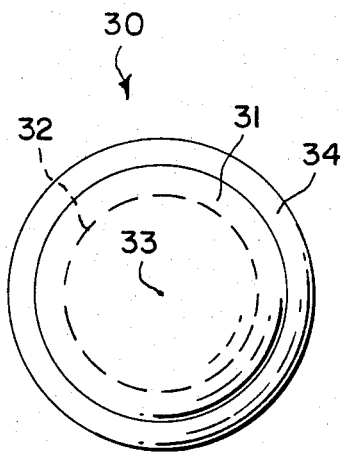
FIG. 6 is a schematic top view of the lens of FIG. 5.

Shown in FIGS. 5 and 6 is another biaspheric lens of this invention, generally 30. The lens 30 comprises two aspheric optical surfaces 31 and 32 on the front and back, respectively, of the lens. The axes of symmetry (not shown) of the aspheric surfaces 31 and 32 are substantially coincident and define a longitudinally extending, optical axis 33 of the lens 30. On the front of the lens 30, adjacent the front aspheric surface 31, is a spherical surface 34. On the back of the lens 30, adjacent the back aspheric surface 32, is a flat land 35, like the flat land 15 adjacent the back aspheric surface 12 of the lens 10 of FIG. 1.

The spherical surface 34 and the flat land 35 of lens 30 each have a precise predetermined location and alignment relative to the axis of symmetry of its adjacent aspheric surface 31 and 32, respectively, and hence, the spherical surface 34 and the flat land 35 each comprise a fiducial surface of this invention for its respective adjacent aspheric surface 31 and 32. Also, the spherical surface 34 and the flat land 35 each extend laterally of the axis of symmetry of its respective adjacent aspheric surface 31 and 32.

In accordance with this invention, the point of symmetry (not shown) of the spherical surface 34 of lens 30 preferably lies on the axis of symmetry (not shown) of the adjacent front aspheric surface 31. Preferably, the spherical surface 34 also abuts the front aspheric surface 31 and extends circumferentially about the axis of symmetry of the front aspheric surface as shown in FIGS. 5 and 6.

The spherical surface 34 of lens 30 can be used for determining precisely any decentration in the axis of symmetry of the adjacent front aspheric surface 31 of the lens 30 (and the optical axis 33 of the lens) relative to the optical axis of an optical system from the behavior of predetermined light waves impinging against the spherical surface 34, and then being reflected from, or transmitted through, the spherical surface 34. This determination can be made by, for example:

(a) observing the interference pattern generated by spherical light waves that converge on the optical axis of the optical system and that reflect off of the spherical surface 34 and off of a spherical reference surface which is in front of the spherical surface 34 and the axis of rotation of which is on the optical axis of the optical system; or (b) observing the specific angle, at which such converging spherical light waves reflect off of, or are transmitted through, the spherical surface 34. Any such observation will precisely indicate if there is any distance between the point of symmetry of the spherical surface 34 of the lens 30 and the optical axis of the optical system, and thereby indicate any corresponding decentration in the axis of symmetry of the front aspheric surface 31 of the lens 30 relative to the optical axis of the optical system.

Figure 7:
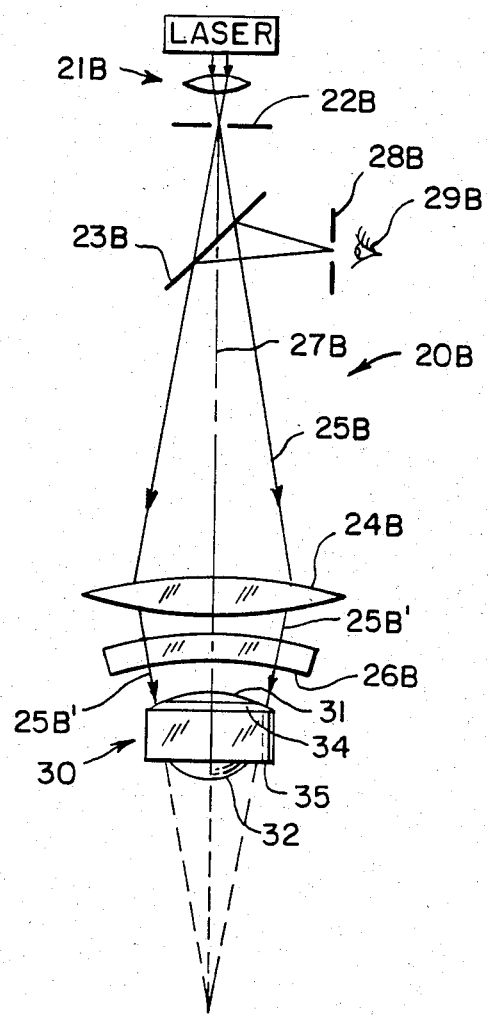
FIG. 7 is a schematic plan view of an optical system in which any distance between the axis of symmetry of the front aspheric surface of the lens of FIG. 5 and the optical axis of the optical system, i.e., any decentration, can be precisely determined from the interference behavior of light waves impinging against, and reflecting from, the front spherical surface of the lens.

Preferably, decentration in the axis of symmetry of the front aspheric surface 31 of the lens 30 of FIGS. 5 and 6 is determined interferometrically with, for example, a Fizeau interferometer 20B as schematically shown in FIG. 7. The interferometer 20B of FIG. 7 is similar to the interferometer 20 of FIG. 3 in comprising:

a source of monochromatic light 21B; a pinhole 22B; a beam divider 23B; and a lens 24B for converging the divergent light waves 25B from the pinhole 22B into convergent light waves 25B'. The interferometer 20B of FIG. 7 also includes: a concave reference surface 26B which is located in front of the lens 10 and with its axis of rotation coincident with the optical axis 27B of the interferometer 20B; and means 28B, through which a viewer 29B can observe any interference pattern that is generated as the convergent light waves 25B' from the lens 24B impinge against, and then reflect off of, the reference surface 26B and the spherical surface 34 of the lens 30. In carrying out this determination, the optical axis 27B of the interferometer 20B is preferably made to coincide with the optical axis of the optical system, in which the lens 30 is to be used (not shown).

The interference pattern, observed with the interferometer 20B from the spherical surface 34 of lens 30, can also be used to minimize any decentration in the axis of symmetry of the front aspheric surface 31 (and the optical axis 33) of the lens 30 in the optical system to be used, so as to optimize the performance of the lens in the optical system. In this regard, the observed interference pattern can be used to minimize any distance between the point of symmetry of the spherical surface 34 of the lens 30 and the axis of rotation of the reference surface 26B of the interferometer 20B, and thereby used to minimize any decentration of the axis of symmetry of the front aspheric surface 31 of the lens 30 relative to the optical axis 27B of the interferometer 20B. In particular, any decentration in the axis of symmetry of the front aspheric surface 31 relative to the optical axis 27B of the interferometer 20B can be minimized by aligning the lens 30 in the interferometer 20B so that: (1) the lines of interference from the spherical surface 34, visible through viewing means 28B, are as symmetrical as possible about the optical axis 27B of the interferometer; or (2) no lines of interference are visible.

The flat land 35 of lens 30 can also be used for precisely determining tilt in the alignment of the axis of symmetry of the adjacent back aspheric surface 32 relative to the optical axis of an optical system. This can be done, for example, in the same way and with the same interferometer 20 as is shown in FIG. 3 for measuring tilt in the front aspheric surface 11 of the lens 10 with the front land 14 of the lens 10.

In accordance with this invention, tilt in the alignment of the optical axis 13 of lens 10 of FIGS. 1 and 2, relative to the optical axis of an optical system, can be precisely determined from the longitudinally extending, cylindrical surface 16 on the lateral sides of the lens 10. The cylindrical surface 16 has a precise predetermined location and alignment relative to the axes of symmetry of the aspheric surfaces 11 and 12 of the lens 10 and hence comprises a fiducial surface of this invention.

Tilt in the alignment of the optical axis 13 of the lens 10, relative to the optical axis of an optical system, can be precisely determined from the behavior of predetermined light waves impinging against the cylindrical surface 16 and then being reflected from, or transmitted through, the cylindrical surface. This determination can be made by, for example: (a) observing the interference pattern generated by cylindrical light waves that converge along the optical axis of the optical system and that reflect off of the cylindrical surface 16 of the lens 10 and off of a cylindrical reference surface which is in front of the cylindrical surface 16 and the axis of which is (i) on the optical axis of the optical system and (ii) aligned in a direction normal to the converging light waves; or (b) observing the specific angle, at which such converging cylindrical light waves reflect off of, or are transmitted through, the cylindrical surface 16 of the lens 10. Any such observation will precisely indicate if there is any deviation in the alignment of the axis of the cylindrical surface 16 of the lens 10 from a direction parallel to the optical axis of the optical system, and thereby indicate any corresponding tilt in the optical axis 13 of the lens 10 relative to the optical axis of the optical system.

Figure 8:
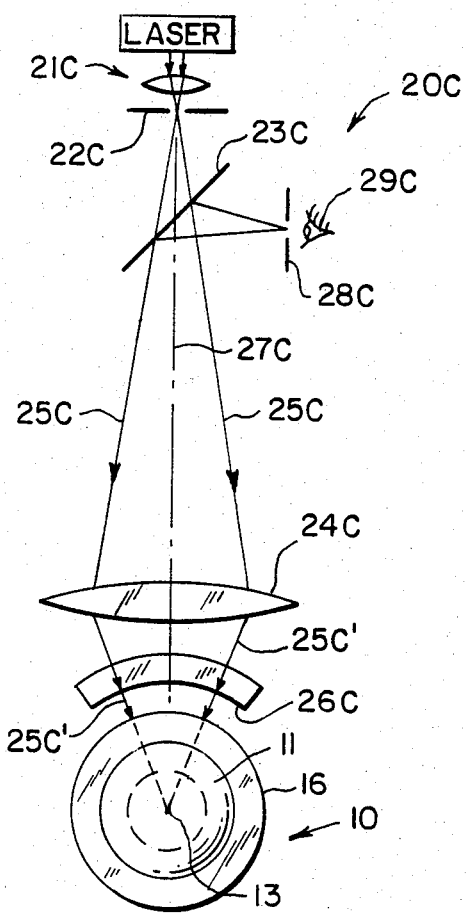
FIG. 8 is a schematic plan view of an optical system in which any tilt in the alignment of the optical axis of the lens of FIG. 1, relative to an axis that is normal to the optical axis of the optical system, can be precisely determined from the interference behavior of light waves impinging against, and reflecting from, the lateral cylindrical surface of the lens.

For example, a Fizeau interferometer 20C, as schematically shown in FIG. 8, can be used to determine interferometrically if there is any tilt in the optical axis 13 of the lens 10 relative to an optical system in which the lens 10 is to be used (not shown). The interferometer 20C of FIG. 8 is like the interferometer 20 of FIG. 3, except the interferometer 20C of FIG. 8 has its optical axis 27C normal to the optical axis of the optical system to be used, and has a cylindrical reference surface 26C with its axis on the optical axis of the optical system, to be used.

The interference pattern, observed with the interferometer 20C from the cylindrical surface 16 of the lens 10, can also be used to minimize any deviation in the alignment of the cylindrical surface 16 from a direction normal to the optical axis 27C of the interferometer 20C (and parallel to the optical axis of the optical system to be used), and thereby minimize the tilt in the optical axis 13 of the lens 10 relative to the optical axis of the optical system to be used. In particular, any tilt in the optical axis 13 of the lens 10, relative to the optical axis of the optical system to be used, can be minimized by aligning the lens 10 in the interferometer 20C so the minimum number of, and preferably no, lines of interference are visible through viewing means 28C.

In accordance with this invention, biaspheric lenses 10 and 30 have been generally disclosed having one or more, fiducial surfaces associated with each aspheric optical surface of the lens. In this regard, it is contemplated that a lens or any other optical element of this invention can have one or more aspheric surfaces on the front and/or the back of the lens and one or more, fiducial surfaces anywhere on the lens, for example, on the front and/or the back of the lens as shown in FIGS. 3, 4 and 7 or on the lateral sides of the lens as shown in FIG. 8. It is also contemplated that a fiducial surface of this invention can be provided on one side of a lens or any other optical element in a precise predetermined location and alignment between a plurality of aspheric surfaces and which the fiducial surface is associated, or circumferentially about a plurality of aspheric surfaces with which the fiducial surface is associated.

Throughout this description of the invention, the use of a Fizeau interferometer has generally been described as an example of means for interferometrically determining the location and/or the alignment of the axis of symmetry of an aspheric surface of a lens provided with a fiducial surface of this invention. An example of a suitable Fizeau interferometer is manufactured by Zygo Corporation, Middletown, Conn. and utilizes a helium-neon gas laser as the source of monochromatic light. However, in the practice of this invention, any conventional means for carrying out such an interferometric determination can be utilized.

It is thought that the invention and many of its attendant advantages will be understood from the foregoing description, and it will be apparent that various changes can be made in the form, construction and arrangement of the parts of the optical elements of this invention, and that various changes can be made in the steps of the process for determining the location and/or the alignment of the point or axis of symmetry of an optical surface of an element of this invention, and in the order of carrying out the steps of the process, without departing from the spirit and scope of the invention or sacrificing all of its material advantages, the optical elements and the process hereinbefore described being merely preferred embodiments thereof.

For example, an optical element, such as a lens, of this invention can have one or more, spherical optical surfaces in place of, or in addition to, any aspheric optical surfaces. In this regard, a separate fiducial surface of this invention can be provided for each spherical surface, with the fiducial surface having a precise predetermined location and alignment relative to the point of symmetry of the spherical surface.

Also, the front land 14 and/or the back land 15 of the lens 10 of FIGS. 1 and 2 can be provided with a pattern of fine grooves having a precise predetermined location and alignment relative to the axis of symmetry of the adjacent, front or back, aspheric surface 11 and 12, respectively. Such grooves can, for example, be concentric circular grooves, each of which has its center on the axis of symmetry of the adjacent aspheric surface 11 and 12. Such grooves can be used to determine precisely the location and/or the alignment of the aspheric surfaces 11 and 12 of the lens 10 from the behavior of predetermined light waves that impinge against the grooves and then are reflected from, or transmitted through, the grooves to form a moiré interference pattern.

Furthermore, the front land 14 of the lens 10 of FIGS. 1 and 2 can extend rearwardly (e.g., as a continuation of the rearward curvature of the front aspheric surface 11), and the back land 15 of the lens 10, which is preferably parallel to the front land 14, can extend rearwardly. Alternatively, the front land 14 can extend frontally, and the parallel back land 15 can extend frontally (e.g., as a continuation of the frontward curvature of the back aspheric surface 12). In either such case, the parallel, front and back lands 14 and 15 will be useful for determining tilt, as well as wedge, in the lens 10 in accordance with this invention. If desired, the front and back lands 14 and 15 can also extend in opposite longitudinal directions so that they are not parallel, but they will not be as useful for determining wedge in the lens 10.

I claim:

1. A method for optically measuring any tilt in the alignment of the axis of symmetry of the surface of a molded aspheric lens relative to the optical axis of an optical system which comprises the steps of:
   (a) molding said lens to its final size and shape with a fiducial surface thereon, said fiducial surface having a predetermined location and alignment relative to the axis or point of symmetry of the optical surface of said lens;
   (b) directing light waves onto said optical surface of said lens that are oriented to the optical axis of said optical system; and
   (c) observing
      (1) the interference pattern generated by said light waves reflecting off said fiducial surface and off a reference surface which is interposed between said fiducial surface and the source of said light waves and is aligned in a direction normal to the optical axis of said optical system; or
      (2) the specific angle at which said waves are reflected off said fiducial surface; or
      (3) the specific angle at which said light waves are bent while being transmitted through said fiducial surface.

2. A method for optically measuring any decentration in the axis of symmetry of the surface of a molded aspheric lens relative to the optical axis of an optical system which comprises the steps of:
   (a) molding said lens to its final size and shape with a fiducial surface thereon, said fiducial surface having a predetermined location and alignment relative to the axis or point of symmetry of the optical surface of said lens;
   (b) directing light waves onto said optical surface of said lens that converge on the optical axis of said optical system; and
   (c) observing
      (1) the interference pattern generated by said light waves reflecting off said fiducial surface and off a reference surface which is interposed between said fiducial surface and the source of said light waves and axis of rotation of which is on the optical axis of said optical system; or
      (2) the specific angle at which said converging light waves are reflected off or are transmitted through said fiducial surface.

3. A method for optically measuring the extent of any wedge in a molded aspheric lens which comprises the steps of:
   (a) molding said lens to its final size and shape with fiducial surfaces each having a predetermined location and alignment relative to the axis or point of symmetry of each optical surface of said lens;
   (b) directing parallel light waves onto said fiducial surface of said lens; and
   (c) observing the interference pattern generated by said light waves reflecting off said fiducial surfaces.

* * * * *